(12) United States Patent
Morris et al.

(10) Patent No.: US 10,922,094 B2
(45) Date of Patent: Feb. 16, 2021

(54) SYSTEMS AND METHODS FOR PROACTIVELY PROVIDING RECOMMENDATIONS TO A USER OF A COMPUTING DEVICE

(71) Applicant: Apple Inc., Cupertino, CA (US)

(72) Inventors: Colin Morris, Cupertino, CA (US); Peter J. Scott, Cupertino, CA (US); Craig M. Federighi, Los Altos Hills, CA (US); Daniel C. Gross, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 14/866,795

(22) Filed: Sep. 25, 2015

(65) Prior Publication Data

US 2016/0357808 A1 Dec. 8, 2016

Related U.S. Application Data

(60) Provisional application No. 62/172,030, filed on Jun. 5, 2015.

(51) Int. Cl.
*G06F 9/445* (2018.01)
*G06F 9/451* (2018.01)
(Continued)

(52) U.S. Cl.
CPC ............ *G06F 9/4451* (2013.01); *G06F 9/453* (2018.02); *G06F 3/0482* (2013.01); *H04M 1/72586* (2013.01)

(58) Field of Classification Search
CPC ......... G06F 17/30867; G06F 17/30528; G06F 9/4451
(Continued)

(56) References Cited

U.S. PATENT DOCUMENTS 8,204,897 B1 * 6/2012 Djabarov ............ G06F 16/9535
707/767
8,468,164 B1 6/2013 Paleja et al.
(Continued)

FOREIGN PATENT DOCUMENTS

CN 104090967 A 10/2014
CN 104111979 A 10/2014
(Continued)

OTHER PUBLICATIONS

International Search Report and Written Opinion for International Application No. PCT/US2016/024258 dated Jul. 20, 2016.
(Continued)

*Primary Examiner* — Ken Hoang
(74) *Attorney, Agent, or Firm* — Dickinson Wright RLLP

(57) ABSTRACT

The embodiments described herein set forth techniques for identifying when a user activates a search application on his or her mobile computing device, and presenting, prior to receiving an input of search parameters from the user, a prediction of one or more applications that the user may be interested in accessing. According to some embodiments, the search application can be configured to interface with an "application prediction engine" each time the search application is activated and query the application prediction engine for a prediction of one or more applications that the user may be interested in accessing. In turn, the application prediction engine can analyze information associated with the applications installed on the mobile computing device to produce the prediction. Using the prediction, the search application can display the predicted one or more applications within a user interface of the search application for selection by the user.

21 Claims, 5 Drawing Sheets

(51) Int. Cl.
*G06F 3/0482* (2013.01)
*H04M 1/725* (2021.01)

(58) Field of Classification Search
USPC .............. 705/14.66, 319; 709/204, 206, 213
See application file for complete search history.

(56) References Cited

U.S. PATENT DOCUMENTS

| | | | |
|---|---|---|---|
| 8,751,321 B2 | 6/2014 | Lemay et al. | |
| 9,667,744 B2 | 5/2017 | Oki et al. | |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06Q 10/10 |
| | | | 715/808 |
| 2010/0070871 A1* | 3/2010 | Liesche | G06F 16/954 |
| | | | 715/744 |
| 2010/0318535 A1* | 12/2010 | Weber | G06F 17/3087 |
| | | | 707/759 |
| 2011/0078775 A1* | 3/2011 | Yan | H04L 63/1433 |
| | | | 726/6 |
| 2012/0123855 A1 | 5/2012 | Gu | |
| 2013/0132896 A1* | 5/2013 | Lee | G06Q 10/10 |
| | | | 715/808 |
| 2013/0232183 A1 | 9/2013 | Lee et al. | |
| 2013/0232256 A1* | 9/2013 | Lee | H04W 4/60 |
| | | | 709/224 |
| 2013/0325942 A1* | 12/2013 | Chen | H04L 65/4084 |
| | | | 709/204 |
| 2014/0129553 A1* | 5/2014 | Sankar | G06F 17/3087 |
| | | | 707/724 |
| 2014/0280098 A1 | 9/2014 | Glover et al. | |
| 2015/0032492 A1* | 1/2015 | Ting | G06Q 10/063112 |
| | | | 705/7.14 |
| 2015/0088955 A1 | 3/2015 | Hendrick et al. | |
| 2015/0095322 A1* | 4/2015 | Procopio | G06F 17/3053 |
| | | | 707/723 |
| 2015/0120722 A1* | 4/2015 | Martìn Martìnez | |
| | | | G06F 17/30867 |
| | | | 707/733 |
| 2016/0189049 A1* | 6/2016 | Silvestri | G06N 99/005 |
| | | | 706/52 |
| 2017/0206361 A1 | 7/2017 | Zhu et al. | |

FOREIGN PATENT DOCUMENTS

| | | | | |
|---|---|---|---|---|
| EP | 2755118 A1 | 7/2014 | | |
| KR | 1020140040823 A | 4/2014 | | |
| KR | 1020140081896 A | 7/2014 | | |
| WO | WO-2010076780 A1 * | 7/2010 | ............ | H04N 7/173 |
| WO | 2015047640 A1 | 4/2015 | | |

OTHER PUBLICATIONS

Korean Patent Application No. 10-2017-7034706—Notice of Preliminary Rejection dated Dec. 18, 2018.
Chinese Patent Application No. 201680032500.0—First Office Action dated Jul. 31, 2020.
Zhao Pan, "11 Apps Recommended by Apple Watch App Store," Zhongguancun Online, 2005, http://apple.zol.com.cn/518/5180745.html.

* cited by examiner

SYSTEMS AND METHODS FOR PROACTIVELY PROVIDING RECOMMENDATIONS TO A USER OF A COMPUTING DEVICE

CROSS-REFERENCE TO RELATED APPLICATIONS

The present application claims the benefit of U.S. Provisional Application No. 62/172,030, entitled "SYSTEMS AND METHODS FOR PROACTIVELY PROVIDING RECOMMENDATIONS TO A USER OF A COMPUTING DEVICE," filed Jun. 5, 2015, the content of which is incorporated herein by reference in its entirety for all purposes.

FIELD

The described embodiments set forth a technique for proactively providing recommendations to a user of a computing device.

BACKGROUND

Recent years have shown a widespread consumer adoption of mobile computing devices (e.g., smartphones and tablets). A noticeable difference between mobile computing devices and traditional computing devices (e.g., desktop computers) is that mobile computing devices tend to be consistently used throughout the day to perform a variety of functions that are highly personalized to their users. Such functions can include activating and deactivating applications that enable the user to, for example, send and receive messages (e.g., emails, chats, etc.), browse the web, listen to music, take photos, and so on. Notably, a user's interaction with his or her mobile computing device can, at least in some areas, conform to a strong and reliable pattern of behavior. For example, a user typically accesses a different subset of applications at different times throughout the day in an identifiable manner, which creates the potential to enhance the user's overall experience—especially in scenarios where a user undergoes the cumbersome process of searching for applications that are not readily accessible (e.g., shown on a home screen) on his or her mobile computing device.

SUMMARY

The embodiments described herein set forth techniques for reducing friction when a user activates a search application on his or her mobile computing device. Specifically, the technique involves presenting, prior to receiving an input of search parameters from the user, a prediction of one or more applications that the user may be interested in accessing, which can reduce the likelihood or necessity for a user to have to manually provide search parameters to the search application. According to some embodiments, the search application can be configured to interface with a prediction engine—referred to herein as an "application prediction engine"—each time the search application is activated (e.g., displayed within a user interface of the mobile computing device). More specifically, when the search application interfaces with the application prediction engine, the search application can issue a request for a prediction of one or more applications that the user may be interested in accessing. In turn, the application prediction engine can analyze information associated with the applications installed on the mobile computing device to produce the prediction. The search application can then display the predicted one or more applications within a user interface of the search application for selection by the user.

One embodiment sets forth a method for providing predictions to a user of a mobile computing device. Specifically, the method is implemented by an application prediction engine executing on the mobile computing device, and includes the steps of (1) receiving, from a search application executing on the mobile computing device, a request to provide a prediction of one or more applications that are installed on the mobile computing device and that the user may be interested in activating, (2) identifying a list of applications that are installed on the mobile computing device, (3) for each application included in the list of applications: (i) generating a score for the application by performing one or more functions on one or more data signals that correspond to the application, and (ii) associating the score with the application, (4) filtering the list of applications in accordance with the generated scores to produce a filtered list of applications, (5) populating the prediction with the filtered list of applications, and (6) providing the prediction to the search application.

Another embodiment sets forth a method for presenting predictions to a user of a mobile computing device. Specifically, the method is implemented by a search application executing on the mobile computing device, and includes the steps of (1) detecting an activation of the search application, (2) issuing, to an application prediction engine, a request for a prediction of one or more applications that are installed on the mobile computing device and that the user may be interested in activating, (3) receiving the prediction from the application prediction engine, wherein the prediction includes a list of one or more applications, and each application is associated with a respective score, and (4) in accordance with the scores, display, within a user interface of the search application, a user interface entry for at least one application of the one or more applications.

Yet another embodiment sets forth a mobile computing device configured to present predictions to a user of the mobile computing device. Specifically, the mobile computing device includes a processor that is configured to execute a search application configured to carry out steps that include (1) detecting an activation of the search application, and (2) prior to receiving an input from the user within a user interface of the search application: (i) issuing, to an application prediction engine executing on the mobile computing device, a request for a list of one or more applications that are installed on the mobile computing device and that the user may be interested in activating, (ii) receiving the list from the application prediction engine, and (iii) displaying, within the user interface of the search application, a user interface entry for at least one application of the one or more applications included in the list. As indicated above, the processor also is configured to execute the application prediction engine, where the application prediction engine is configured to carry out steps that include (1) receiving, from the search application, the request for the list of one or more applications that the user may be interested in activating, (2) generating the list, and (3) providing the list to the search application.

Other embodiments include a non-transitory computer readable medium configured to store instructions that, when executed by a processor, cause the processor to implement any of the foregoing techniques set forth herein.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for their application to wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
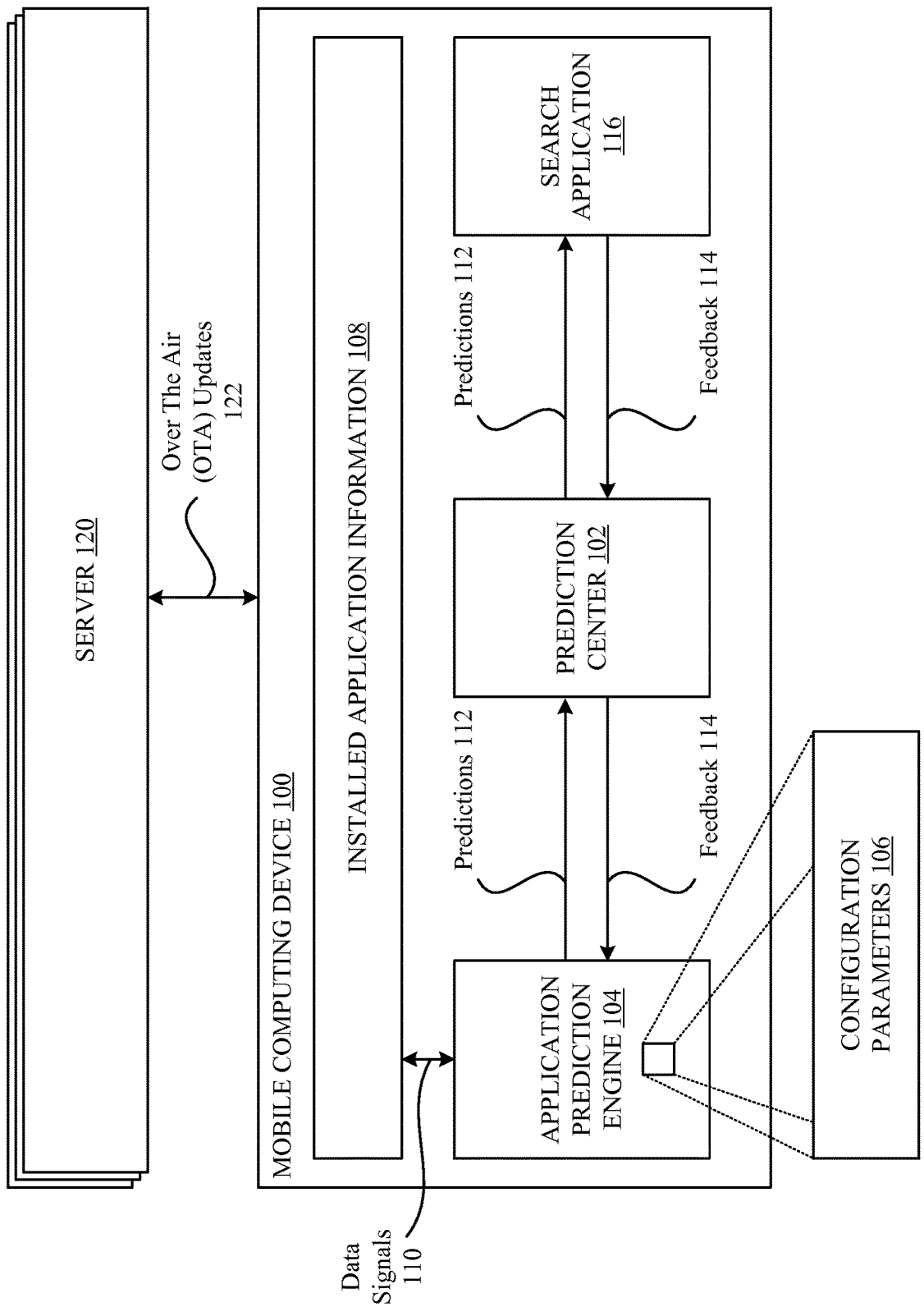
FIG. 1 illustrates a block diagram of different components of a mobile computing device configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for identifying when a user activates a search application on his or her mobile computing device, and presenting, prior to receiving an input of search parameters from the user, a prediction of one or more applications that the user may be interested in accessing. According to some embodiments, the search application can be configured to interface with an application prediction engine each time the search application is activated (e.g., displayed within a user interface of the mobile computing device) and query the application prediction engine for a prediction of one or more applications that the user may be interested in accessing. In turn, the application prediction engine can analyze information associated with the applications installed on the mobile computing device to produce the prediction. This information can include, for example, application installation timestamps, application activation timestamps, application activation totals, application usage metrics, positions of application icons within a main user interface (e.g., on a home screen, within a folder, etc.), search parameters recently provided by the user, feedback gathered that indicates whether previous predictions were accurate, and the like, which can enable the application prediction engine to provide meaningful and relevant predictions to the search application. In turn, the search application can display the predicted one or more applications within a user interface of the search application for selection by the user. Notably, this technique can substantially reduce occurrences where the user undergoes the cumbersome process of entering search parameters each time he or she is seeking to access a particular application, which can provide a substantial improvement to the user's overall satisfaction with his or her mobile computing device.

Although the embodiments set forth herein primarily involve application prediction engines that are configured to predict applications that a user may desire to access, it is noted that other prediction engines that serve to provide different kinds of predictions (e.g., people a user is likely to contact) can be implemented within the mobile computing device. More specifically, and according to some embodiments, each prediction engine can be configured to assign itself as an "expert" for a particular prediction category within the mobile computing device. For example, an application prediction engine can assign itself as an expert on an "application" prediction category to indicate that the application prediction engine specializes in predicting applications that a user of the mobile computing device might be interested in accessing. According to some embodiments, an application prediction engine can employ learning models that enable the application prediction engine to analyze data (e.g., the information described above) and provide predictions in accordance with the data. Although this disclosure primarily discusses an application prediction engine that is configured to implement learning models, it is noted that any technique for analyzing behavioral data and providing predictions can be employed by the application prediction engine described herein. Moreover, it is noted that the application prediction engine can vary in functionality across different types of user devices (e.g., smartphones, tablets, watches, laptops, etc.) in order to provide specialized predictions for the different types of user devices. For example, a first type of application prediction engine can be assigned to smartphones, a second type of application prediction engine can be assigned to tablets, and so on.

As set forth above, each prediction engine implemented on the mobile computing device can assign itself as an expert on one or more prediction categories within the mobile computing device. Consequently, in some cases, two or more application prediction engines can assign themselves as experts on the "application" prediction category. In this scenario, when the search application described herein issues a request for a prediction, each application prediction engine of the two or more application prediction engines will conduct its own analysis (e.g., in accordance with learning models employed by the application prediction engines) and generate a prediction in accordance with the request. In this scenario, at least two or more predictions are generated in response to the request for the prediction, which can establish redundancies and competing predictions that the search application may not be capable of interpreting.

Accordingly, the embodiments also set forth a "prediction center" that is configured to serve as a mediator between the application prediction engines and the search application. To provide this functionality, the prediction center can be configured to serve as a registrar for prediction engines (e.g., application prediction engines) when they initialize and seek to assign themselves as experts for one or more prediction categories (e.g., the "application" prediction category). Similarly, and according to some embodiments, the prediction center can also be configured to manage different types of prediction categories within the mobile computing device, such that consumer applications (e.g., the search application described herein) can query the prediction center to identify categories of predictions that can be provided. In this manner, when a consumer application issues a request for a prediction for a particular prediction category, and two or more prediction engines respond with their respective prediction(s), the prediction center can be configured to receive and process the predictions prior to responding to the request issued by the consumer application. Processing the predictions can involve, for example, removing duplicate information that exists across the predictions, applying weights to the predictions in accordance with historical performance (i.e., accuracy) metrics associated with the prediction engines, sorting the predictions in accordance with scores advertised by the prediction engines when generating their predictions, and the like. In this manner, the prediction center can distill multiple predictions down into an optimized prediction and provide the optimized prediction to the consumer application. Accordingly, this design beneficially simplifies the operating requirements of the consumer applications (as they do not need to be capable of processing multiple predictions), consolidates the heavy lifting to the prediction center, and enables the consumer applications to obtain a prediction that represents the input of various prediction engines that have assigned themselves as experts on the prediction category of interest.

Accordingly, the different techniques set forth above enable the search application to interact with the prediction center to receive predictions that potentially can be used to enhance overall user experience. In some cases, it can be valuable for the search application to provide feedback to the prediction center/the application prediction engine to indicate whether a prediction was accurate. Such feedback can be beneficial, for example, when learning algorithms are implemented by the application prediction engines, as the feedback can be used to "train" the learning algorithms and improve the overall accuracy of their predictions. For example, when an application prediction engine generates a prediction that a particular application is most likely to be activated by a user (e.g., when displayed within the search application prior to receiving search input from the user), the search application can provide feedback that indicates the prediction held true (e.g., the particular application was selected and activated by the user). In turn, the application prediction engine can increase the scores that are advertised when similar and subsequent predictions are produced by the prediction engine.

In addition, it is noted that the architecture of the prediction center can be configured in a manner that enables the different entities described herein—such as the application prediction engines—to function as modular components within the mobile computing device. In one architectural approach, each application prediction engine can be configured as a bundle whose format (e.g., a tree-like structure) is understood by the prediction center and enables the prediction center to function as a platform for implementing the functionality of the application prediction engine. According to this approach, the prediction center can be configured to, for example, parse different file system paths (e.g., when initializing) to identify different bundles that reside within the mobile computing device. In this manner, the bundles can be conveniently added to, updated within, and removed from the file system of the mobile computing device, thereby promoting a modular configuration that can efficiently evolve over time without requiring substantial updates (e.g., operating system upgrades) to the mobile computing device. For example, an application prediction engine can be configured in a manner that enables all or a portion of the logic implemented by the application prediction engine to be updated (e.g., through an over the air (OTA) update). It is noted that the foregoing architectures are exemplary, and that any architecture can be used that enables the various entities described herein to communicate with one another and provide their different functionalities.

Additionally, the prediction center/application prediction engines can also be configured to implement one or more caches that can be used to reduce the amount of processing that takes place when generating predictions. According to some embodiments, a prediction, upon generation, can be accompanied by "validity parameters" that indicate when the prediction should be removed from the cache in which the prediction is stored. The validity parameters also referred to herein as "expiration information"—can define, for example, time-based expirations, event-based expirations, and the like. In this manner, when an application prediction engine frequently receives requests for a prediction from the search application, the application prediction engine can generate and cache the prediction in order to substantially reduce the amount of future processing that would otherwise occur when processing repeated requests for the prediction. It is noted that the prediction center/application prediction engines can be configured to cache predictions using a variety of approaches. For example, when available cache memory is limited, the prediction center/application prediction engines can be configured to generate predictions a threshold number of times (e.g., within a time window), and, when the threshold is satisfied, transition to caching the prediction and referencing the cache for subsequent requests for the prediction (so long as the expiration information indicates the prediction is valid).

Accordingly, the embodiments described herein set forth techniques for identifying when a user activates a search application on his or her mobile computing device, and presenting, prior to receiving an input of search parameters from the user, a prediction of one or more applications that the user may be interested in accessing. A more detailed discussion of these techniques is set forth below and described in conjunction with FIGS. 1-5, which illustrate detailed diagrams of systems, methods, and user interfaces that can be used to implement these techniques.

FIG. 1 illustrates a block diagram of different components of a mobile computing device 100 that is configured to implement the various techniques described herein, according to some embodiments. More specifically, FIG. 1 illustrates a high-level overview of the mobile computing device 100, which, as shown, is configured to implement a prediction center 102, an application prediction engine 104, and a search application 116. According to some embodiments, the prediction center 102, the application prediction engine 104, and the search application 116 can be implemented within an operation system (OS) (not illustrated in FIG. 1) that is configured to execute on the mobile computing device 100. As shown in FIG. 1, the prediction center 102 can be configured to serve as a mediator between the application prediction engine 104 and the search application 116. Although not illustrated in FIG. 1, the prediction center 102 can be configured to implement an aggregator that is configured to consolidate multiple predictions, e.g., when two or more application prediction engines 104 are implemented and two or more predictions are produced in response to a request issued by the search application 116. It is noted, however, that both the application prediction engine 104 and the search application 116 can be configured to communicate directly with one another to reduce or even eliminate the need for the prediction center 102 to be implemented within the mobile computing device 100. It is further noted that the application prediction engine 104 and the search application 116 are not required to be logically separated from one another, and that the different functionalities implemented by these entities can be combined to establish different architectural approaches that provide the same results.

As shown in FIG. 1, predictions 112 can be communicated between the application prediction engine 104 and the search application 116, e.g., the prediction center 102 can receive predictions 112 generated by the application prediction engine 104 and forward the predictions 112 to the search application 116. Feedback 114 can also be communicated between the application prediction engine 104 and the search application 116, e.g., the prediction center 102 can receive feedback 114 from the search application 116 and provide the feedback 114 to the application prediction engine 104 so that the application prediction engine 104 can increase prediction 112 accuracy over time.

Additionally, the prediction center 102 can be configured to implement a cache that enables the prediction center 102/the application prediction engine 104 to cache predictions 112 in attempt to increase processing and energy consumption efficiency at the mobile computing device 100. For example, the cache can include multiple entries, where each entry includes a prediction 112 as well as expiration information that indicates how long the prediction 112 is considered to be valid. The expiration information can include, for example, time-based expirations, event-based expirations, and the like. In this manner, when the application prediction engine 104 frequently receives requests for a prediction 112, the application prediction engine 104 can generate and cache the prediction 112 in order to substantially reduce the amount of processing that would otherwise occur at the mobile computing device 100, thereby enhancing performance.

As previously set forth herein, the application prediction engine 104 can be implemented using a variety of architectural approaches, e.g., the application prediction engine 104 can be a standalone executable that is external to the prediction center 102 and communicates with the prediction center 102 via Application Programming Interface (API) commands that are supported by the prediction center 102 and utilized by the application prediction engine 104, the application prediction engine 104 can be a bundle that is stored within a file system of the mobile computing device 100 and that is interpreted and implemented by the prediction center 102, and the like. As shown in FIG. 1, the application prediction engine 104 can include configuration parameters 106 that dictate the manner in which the application prediction engine 104 generates predictions for the search application 116. In particular, the configuration parameters 106 can define the manner in which data signals 110—which correspond to installed application information 108 that is available to the application prediction engine 104 within the mobile computing device 100—are received by the application prediction engine 104 and processed by the application prediction engine 104. According to some embodiments, the data signals 110 can represent application installation timestamps (i.e., when each application was installed), application activation timestamps (e.g., the last time each application was activated), application activation totals (e.g., the total number of times an application has been activated), application usage metrics (e.g., the frequency at which the application is activated, possibly conditioned by factors such as time of day or location), and the like. The data signals 110 can also include positions of application icons within a main user interface (e.g., on a home screen, within a folder, etc.) of the mobile computing device 100, application search parameters recently provided by the user, feedback gathered that indicates whether previous predictions provided by the application prediction engine 104 were accurate, and the like.

Although not illustrated in FIG. 1, the application prediction engine 104 can be configured to implement learning models that enable the application prediction engine 104 to provide predictions 112 that evolve over time and remain relevant to the user of the mobile computing device 100. According to some embodiments, the learning models can represent algorithms that are configured to analyze information (e.g., the data signals 110) and generate predictions 112 that can enhance a user's overall experience when operating the mobile computing device 100. According to some embodiments, the information processed by the application prediction engine 104 can be gathered from various sources within the mobile computing device 100, e.g., file systems implemented on the mobile computing device 100, feedback information provided by the search application 116, information gathered by sensors of the mobile computing device 100 (e.g., Global Positioning System (GPS) sensors, microphone sensors, temperature sensors, accelerometer sensors, and so on), information provided by outside sources (e.g., other applications executing on the mobile computing device 100, OS kernels, etc.), and the like.

Additionally, and as shown in FIG. 1, the mobile computing device 100 can be configured to interface with one or more servers 120 (e.g., via an Internet connection) in order to receive over the air (OTA) updates 122 that can be used to partially or fully update one or more of the application prediction engine 104, the prediction center 102, and the search application 116. Accordingly, FIG. 1 provides a high-level overview of various components that can be used to implement the techniques set forth herein.

Figure 2:
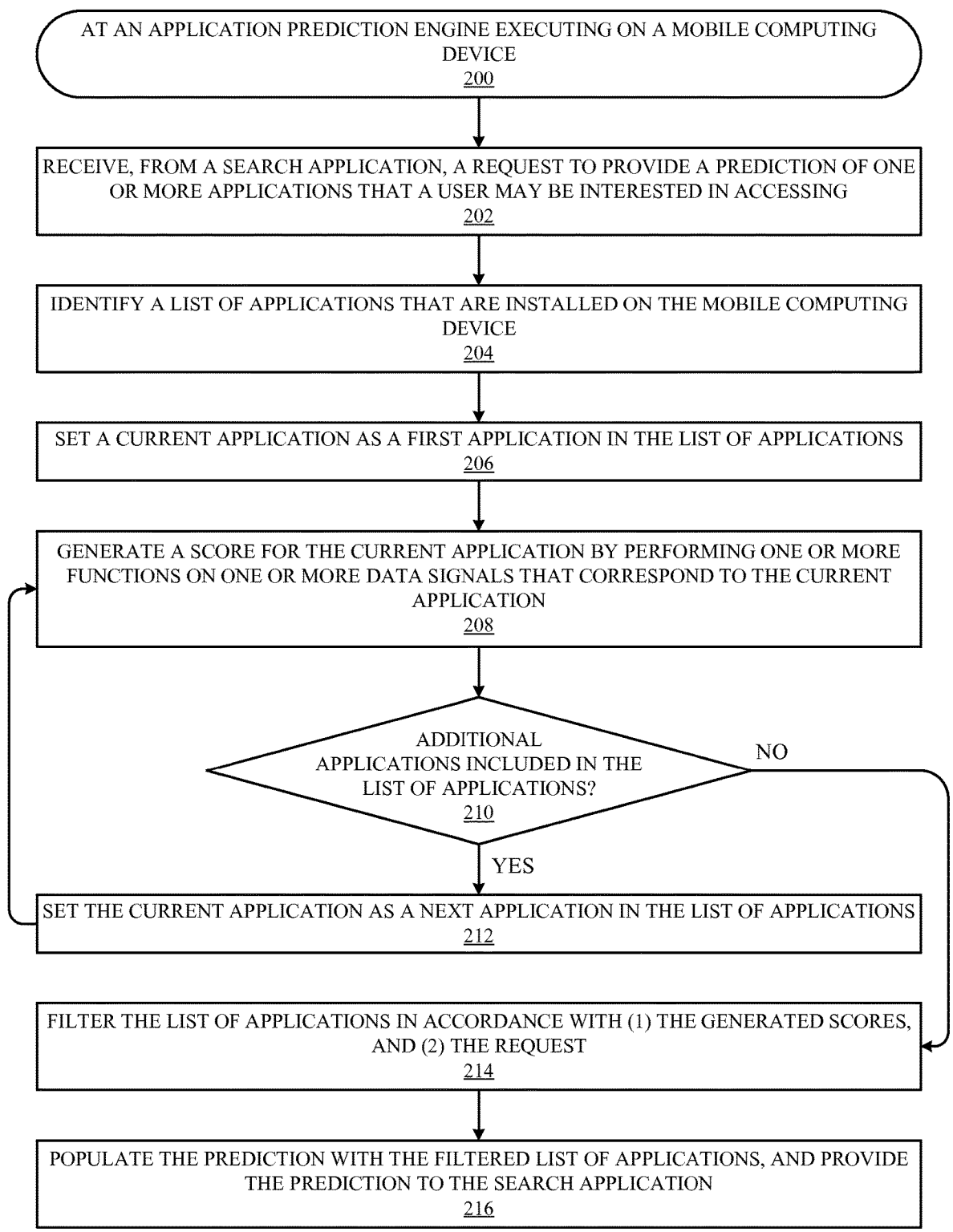
FIG. 2 illustrates a method that is implemented by the application prediction engine of FIG. 1, according to some embodiments.

FIG. 2 illustrates a method 200 that is implemented by the application prediction engine 104, according to some embodiments. Although the method 200 is described as the application prediction engine 104 and the search application 116 communicating directly between one another, it is noted that the prediction center 102 can serve as a mediator between the application prediction engine 104 and the search application 116 in accordance with the various functionalities provided by the prediction center 102 described herein. As shown, the method 200 begins at step 202, where the application prediction engine 104 receives, from a search application 116, a request to provide a prediction 112 of one or more applications installed on the mobile computing device 100 that a user of the mobile computing device 100 may be interested in accessing. This request can be issued by the search application 116 in response to the search application activating on the mobile computing device 100, e.g., when a user of the mobile computing device 100 inputs a gesture to cause the search application to activate.

At step 204, the application prediction engine 104 identifies a list of applications that are installed on the mobile computing device 100. This information can be obtained, for example, by way of the installed application information 108 and the data signals 110. According to some embodiments, the list of applications can be filtered to omit applications whose corresponding icons are displayed within a main user interface (e.g., a home screen) of the mobile computing device 100, as it is unlikely that these applications will be searched for by the user. In this manner, the application prediction engine 104 can avoid carrying out the processing that is required to generate scores for these applications, which can increase efficiency. It is noted that other filtering techniques can be implemented to eliminate applications from the list of applications that should not be considered when the application prediction engine 104 is analyzing the list of applications according to the various techniques described herein (e.g., steps 206-212 described below in conjunction with FIG. 2).

At step 206, the application prediction engine 104 sets a current application as a first application in the list of applications. At step 208, the application prediction engine 104 performs one or more functions on one or more data signals 110 that correspond to the current application in order to generate a score for the current application. According to some embodiments, an initial phase of performing a function on a data signal 110 can involve establishing a preliminary score for the data signal 110. For example, when the data signal 110 corresponds to an installation date of an application, the preliminary score can be based on an amount of time that has elapsed since the application was installed, e.g., higher points for a more recent installation date. In another example, when the data signal 110 corresponds to information that identifies a position of an icon for the application within a user interface of the mobile computing device 100, the preliminary score can be based on a user interface page number (e.g., a page number in which the icon resides relative to a home screen), whether the icon is included in a user interface folder, and the like. In this manner, the preliminary score establishes a baseline value that can be further adjusted in accordance with weights that correspond to the data signal 110, which is described below in greater detail.

According to some embodiments, and as described above, performing the function on the data signal 110 can include an additional phase that involves adjusting the preliminary score in accordance with a fixed weight that is associated with the data signal 110. Alternatively, the weight can be dynamic in nature and change over time, e.g., the weight can represent a value that decays over time (e.g., a half-life), which be beneficial for data signals 110 that represent temporal information associated with applications (e.g., application installation timestamps, application activation timestamps, etc.). In any case, an updated score can be produced by applying the weight to the preliminary score. In this manner, and upon a completion of the one or more functions on the one or more data signals 110 that correspond to the current application, the prediction engine can produce a final form of the score (e.g., a summation of the individual scores) for the current application.

At step 210, the application prediction engine 104 determines whether additional applications are included in the list of applications. If, at step 210, the application prediction engine 104 determines that additional applications are included in the list of applications, then the method 200 proceeds to step 212. Otherwise, the method 200 proceeds to step 214, which is described below in greater detail. At step 212, the application prediction engine 104 sets the current application as a next application in the list of applications. At step 214, the application prediction engine 104 filters the list of applications in accordance with (1) the generated scores, and (2) the request received at step 202. For example, the request can indicate that only three application suggestions can be displayed within the user interface of the mobile computing device 100 (e.g., in accordance with a screen size or a resolution setting), which can cause the application prediction engine 104 to eliminate, from the list of applications, any applications whose scores are not in the top three positions of the list. At step 216, the application prediction engine 104 populates the prediction 112 with the filtered list of applications, and provides the prediction 112 to the search application 116.

Figure 3:
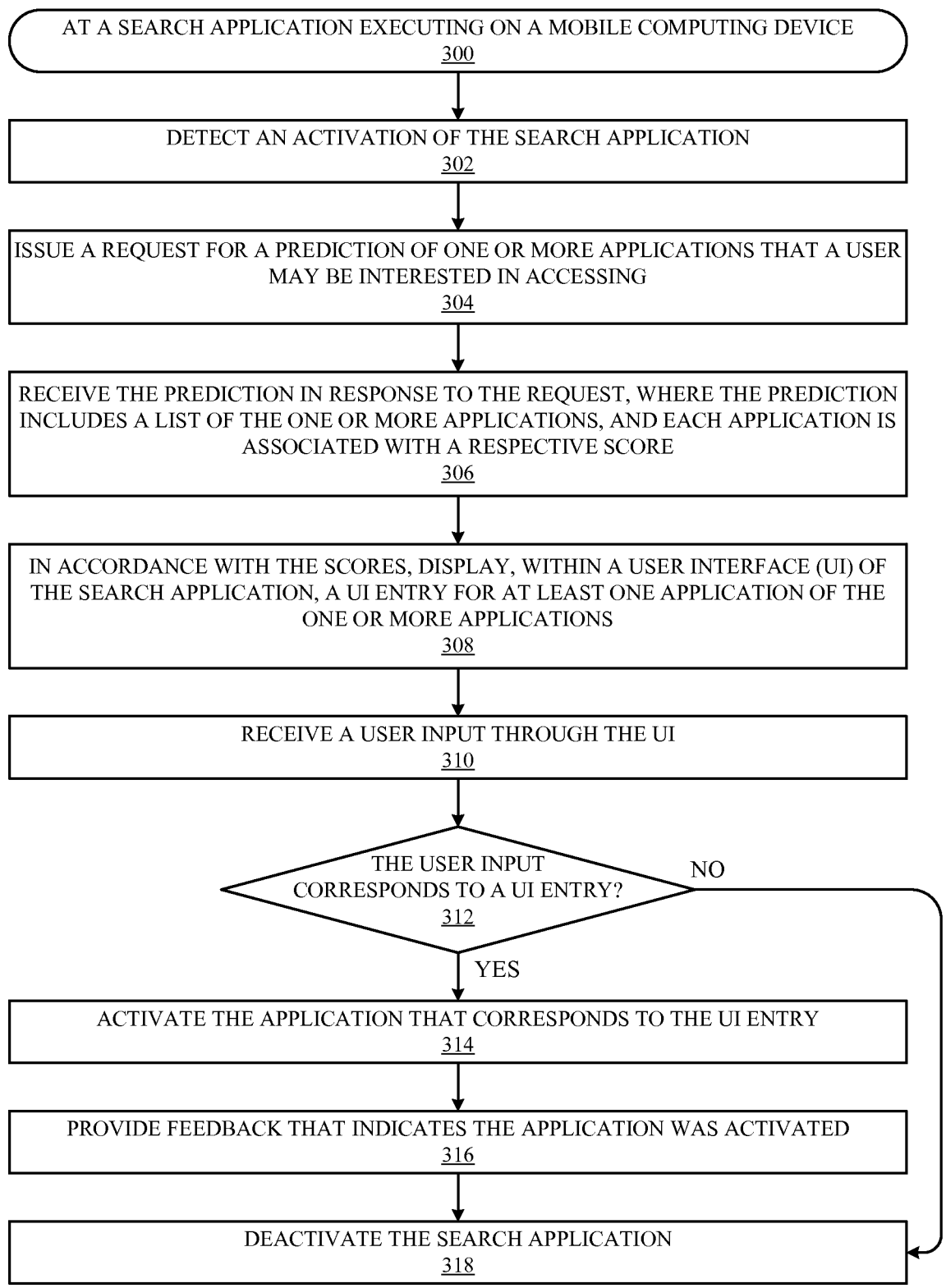
FIG. 3 illustrates a method that is implemented by the search application of FIG. 1, according to some embodiments.
Figure 4:
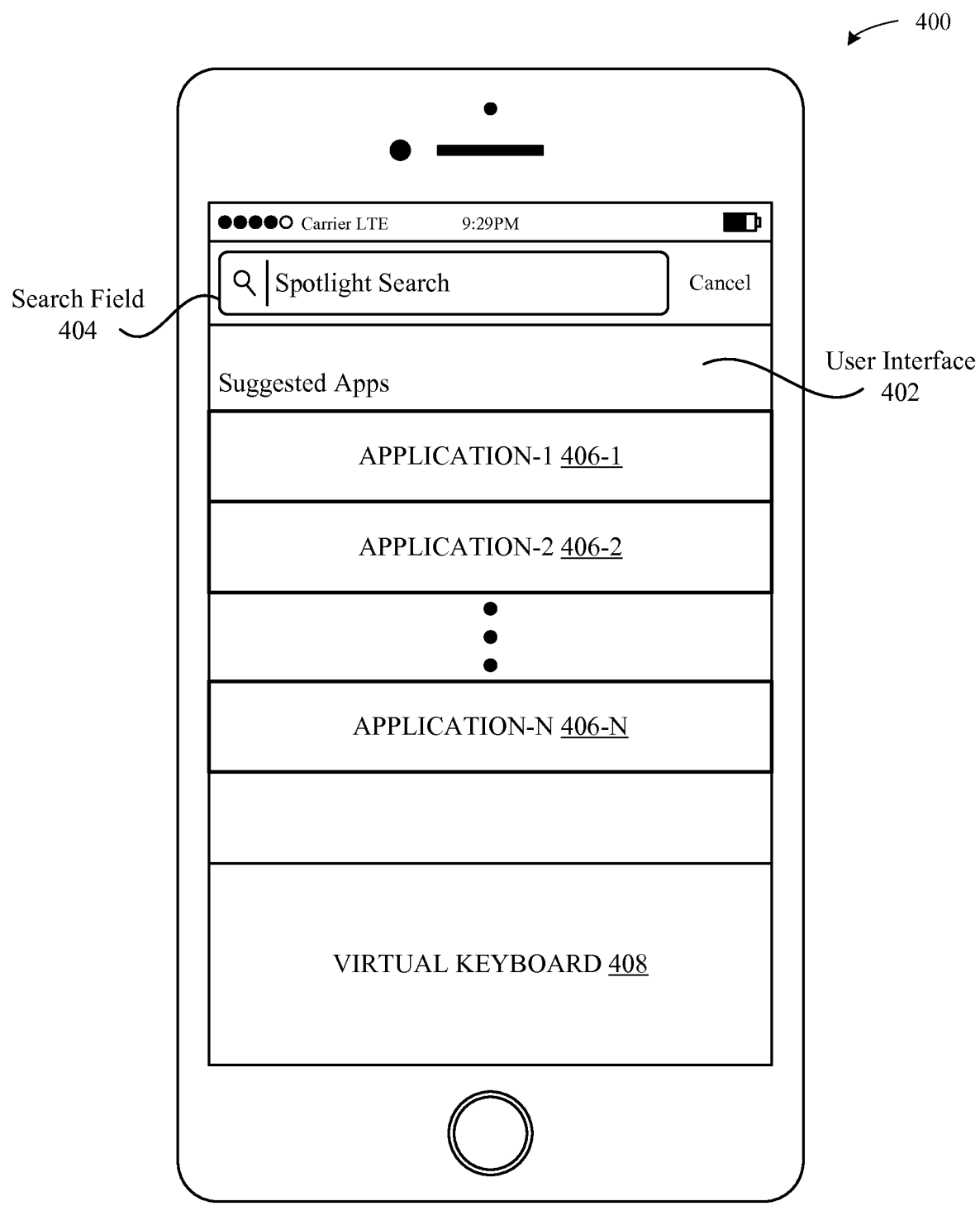
FIG. 4 illustrates a conceptual diagram of an example user interface of the search application of FIG. 1, according to some embodiments.

FIG. 3 illustrates a method 300 that is implemented by the search application 116, according to some embodiments. As shown, the method 300 begins at step 302, where the search application 116 is activated. At step 304, the search application 116 issues a request for a prediction 112 of one or more applications that a user may be interested in accessing. At step 306, the search application 116 receives the prediction 112 in response to the request, where the prediction 112 includes a list of the one or more applications, and each application is associated with a respective score (e.g., in accordance with the techniques described above in conjunction with FIG. 2). At step 308, the search application 116, in accordance with the scores, displays, within a user interface of the search application 116, a user interface entry for at least one application of the one or more applications (e.g., as illustrated in FIG. 4 and described below). At step 310, the search application 116 receives a user input through the user interface.

At step 312, the search application 116 determines whether the user input corresponds to a user interface entry. If, at step 312, the search application 116 determines that the user input corresponds to a user interface entry, then the method 300 proceeds to step 314. Otherwise, the method 300 proceeds to step 318, which is described below in greater detail. At step 314, the search application 116 activates the application that corresponds to the user interface entry. At step 316, the search application 116 provides feedback that indicates the application was activated. Finally, at step 318, the search application 116 deactivates itself.

FIG. 4 illustrates a conceptual diagram 400 of an example user interface 402 of the search application 116 described herein, according to some embodiments. As shown in FIG. 4, the user interface 402 can include a search field 404 that enables a user of the mobile computing device 100 to input search parameters (e.g., using a virtual keyboard 408 included in the user interface 402). Moreover, the user interface 402 can include a listing of multiple user interface entries 406 for applications that the user may be interested in activating, which can be obtained by way of predictions 112 produced by the application prediction engine 104 described herein. In turn, when feedback is provided by the user—which can include, for example, cancelling the search, ignoring the suggested apps and inputting search parameters, or selecting one of the user interface entries 406—the feedback can be forwarded to the application prediction engine 104 for handling.

Figure 5:
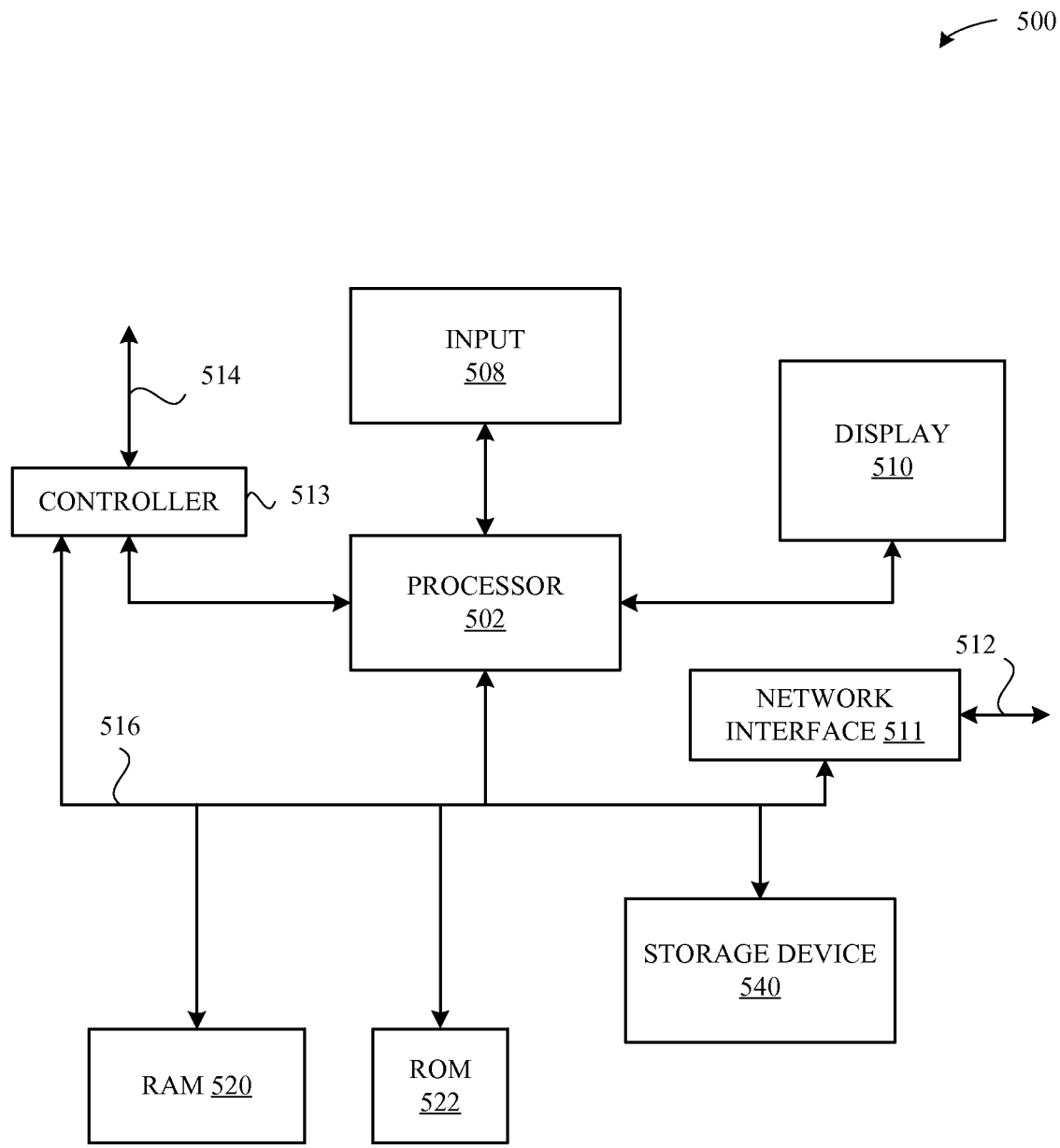
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the mobile computing device 100 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also include a storage device 540, which can comprise a single disk or a plurality of disks (e.g., hard drives), and includes a storage management module that manages one or more partitions within the storage device 540. In some embodiments, the storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 500.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for proactively providing predictions to a user of a mobile device, the method comprising, at a prediction center executing on the mobile device:
   for each prediction engine of a plurality of prediction engines executing locally on the mobile device:
      receiving, from the prediction engine, a respective request for the prediction engine to function as an expert on at least one prediction category of a plurality of prediction categories, and
      updating a configuration of the prediction center to reflect a registration of the prediction engine as an expert on the at least one prediction category;
   receiving, from a search application executing on the mobile device, a request for an optimized list of applications that the user is likely to activate, wherein the request corresponds to a particular prediction category, and the particular prediction category relates to applications that the user is likely to activate;
   identifying, among the plurality of prediction engines, at least two prediction engines that are registered as experts on the particular prediction category;
   issuing, to each prediction engine of the at least two prediction engines, requests for respective lists of applications that the user is likely to activate;
   receiving the respective lists from the at least two prediction engines;
   processing the respective lists of applications to generate the optimized list of applications; and
   providing the optimized list to the search application.

2. The method of claim 1, wherein processing the respective lists of applications to establish the optimized list of applications comprises:
   removing redundant information;
   applying respective weights to each of the respective lists, wherein each respective weight is based on historical accuracy metrics associated with the prediction engine that provides the respective list; and/or
   sorting one or more of the respective lists or the optimized list in accordance with scores included therein, wherein each score corresponds to a likelihood that a particular application will be activated by the user.

3. The method of claim 2, wherein applying the respective weights comprises:
   adjusting the scores in accordance with the respective weights.

4. The method of claim 2, wherein each prediction engine of the at least two prediction engines establishes respective scores for each application by performing at least one function on at least one data signal that corresponds to the application.

5. The method of claim 4, wherein the at least one data signal that corresponds to an application is selected from one or more of:
   application installation timestamps,
   application activation timestamps,
   application activation totals,
   application usage metrics,
   positions of application icons within a main user interface of the mobile device,
   search parameters recently provided by the user, and
   gathered feedback that indicates whether previous predictions were accurate.

6. The method of claim 5, wherein a position of an application icon for a given application within the main user interface of the mobile device indicates:
   a page number of the main user interface in which the application icon is included, or an indication of whether the application icon is included in a folder within the main user interface.

7. The method of claim 5, further comprising, subsequent to providing the optimized list to the search application:
receiving feedback from the search application, wherein the feedback indicates a behavior of the user subsequent to viewing the optimized list of applications in the search application; and
updating the gathered feedback to reflect the feedback received from the search application.

8. At least one non-transitory computer readable storage medium configured to store instructions that, when executed by at least one processor included in a mobile device, cause the mobile device to proactively provide predictions to a user of the mobile device, by carrying out steps that include:
for each prediction engine of a plurality of prediction engines executing locally on the mobile device:
receiving, from the prediction engine, a respective request for the prediction engine to function as an expert on at least one prediction category of a plurality of prediction categories, and
updating a configuration of the prediction center to reflect a registration of the prediction engine as an expert on the at least one prediction category;
receiving, from a search application executing on the mobile device, a request for an optimized list of applications that the user is likely to activate, wherein the request corresponds to a particular prediction category, and the particular prediction category relates to applications that the user is likely to activate;
identifying, among the plurality of prediction engines, at least two prediction engines that are registered as experts on the particular prediction category;
issuing, to each prediction engine of the at least two prediction engines, requests for respective lists of applications that the user is likely to activate;
receiving the respective lists from the at least two prediction engines;
processing the respective lists of applications to generate the optimized list of applications; and
providing the optimized list to the search application.

9. The at least one non-transitory computer readable storage medium of claim 8, wherein processing the respective lists of applications to establish the optimized list of applications comprises:
removing redundant information;
applying respective weights to each of the respective lists, wherein each respective weight is based on historical accuracy metrics associated with the prediction engine that provides the respective list; and/or
sorting one or more of the respective lists or the optimized list in accordance with scores included therein, wherein each score corresponds to a likelihood that a particular application will be activated by the user.

10. The at least one non-transitory computer readable storage medium of claim 9, wherein applying the respective weights comprises:
adjusting the scores in accordance with the respective weights.

11. The at least one non-transitory computer readable storage medium of claim 9, wherein each prediction engine of the at least two prediction engines establishes respective scores for each application by performing at least one function on at least one data signal that corresponds to the application.

12. The at least one non-transitory computer readable storage medium of claim 11, wherein the at least one data signal that corresponds to an application is selected from one or more of:
application installation timestamps,
application activation timestamps,
application activation totals,
application usage metrics,
positions of application icons within a main user interface of the mobile device,
search parameters recently provided by the user, and
gathered feedback that indicates whether previous predictions were accurate.

13. The at least one non-transitory computer readable storage medium of claim 12, wherein a position of an application icon for a given application within the main user interface of the mobile device indicates:
a page number of the main user interface in which the application icon is included, or
an indication of whether the application icon is included in a folder within the main user interface.

14. The at least one non-transitory computer readable storage medium of claim 12, wherein the steps further include, subsequent to providing the optimized list to the search application:
receiving feedback from the search application, wherein the feedback indicates a behavior of the user subsequent to viewing the optimized list of applications in the search application; and
updating the gathered feedback to reflect the feedback received from the search application.

15. A mobile device configured to proactively provide predictions to a user of a mobile device, the mobile device comprising:
at least one processor; and
at least one memory storing instructions that, when executed by the at least one processor, cause the mobile device to:
for each prediction engine of a plurality of prediction engines executing locally on the mobile device:
receive, from the prediction engine, a respective request for the prediction engine to function as an expert on at least one prediction category of a plurality of prediction categories, and
update a configuration of the prediction center to reflect a registration of the prediction engine as an expert on the at least one prediction category;
receive, from a search application executing on the mobile device, a request for an optimized list of applications that the user is likely to activate, wherein the request corresponds to a particular prediction category, and the particular prediction category relates to applications that the user is likely to activate;
identify, among the plurality of prediction engines, at least two prediction engines that are registered as experts on the particular prediction category;
issue, to each prediction engine of the at least two prediction engines, requests for respective lists of applications that the user is likely to activate;
receive the respective lists from the at least two prediction engines;
process the respective lists of applications to generate the optimized list of applications; and
provide the optimized list to the search application.

16. The mobile device of claim 15, wherein processing the respective lists of applications to establish the optimized list of applications comprises:
- removing redundant information;
- applying respective weights to each of the respective lists, wherein each respective weight is based on historical accuracy metrics associated with the prediction engine that provides the respective list; and/or
- sorting one or more of the respective lists or the optimized list in accordance with scores included therein, wherein each score corresponds to a likelihood that a particular application will be activated by the user.

17. The mobile device of claim 16, wherein applying the respective weights comprises:
- adjusting the scores in accordance with the respective weights.

18. The mobile device of claim 16, wherein each prediction engine of the at least two prediction engines establishes respective scores for each application by performing at least one function on at least one data signal that corresponds to the application.

19. The mobile device of claim 18, wherein the at least one data signal that corresponds to an application is selected from one or more of:
- application installation timestamps,
- application activation timestamps,
- application activation totals,
- application usage metrics,
- positions of application icons within a main user interface of the mobile device,
- search parameters recently provided by the user, and
- gathered feedback that indicates whether previous predictions were accurate.

20. The mobile device of claim 19, wherein a position of an application icon for a given application within the main user interface of the mobile device indicates:
- a page number of the main user interface in which the application icon is included, or
- an indication of whether the application icon is included in a folder within the main user interface.

21. The mobile device of claim 19, wherein the at least one processor further causes the mobile device to, subsequent to providing the optimized list to the search application:
- receive feedback from the search application, wherein the feedback indicates a behavior of the user subsequent to viewing the optimized list of applications in the search application; and
- update the gathered feedback to reflect the feedback received from the search application.

* * * * *